Sept. 4, 1934.  F. CLARE  1,972,619
GREASING PUMP OR GREASE GUN
Filed Nov. 14, 1933
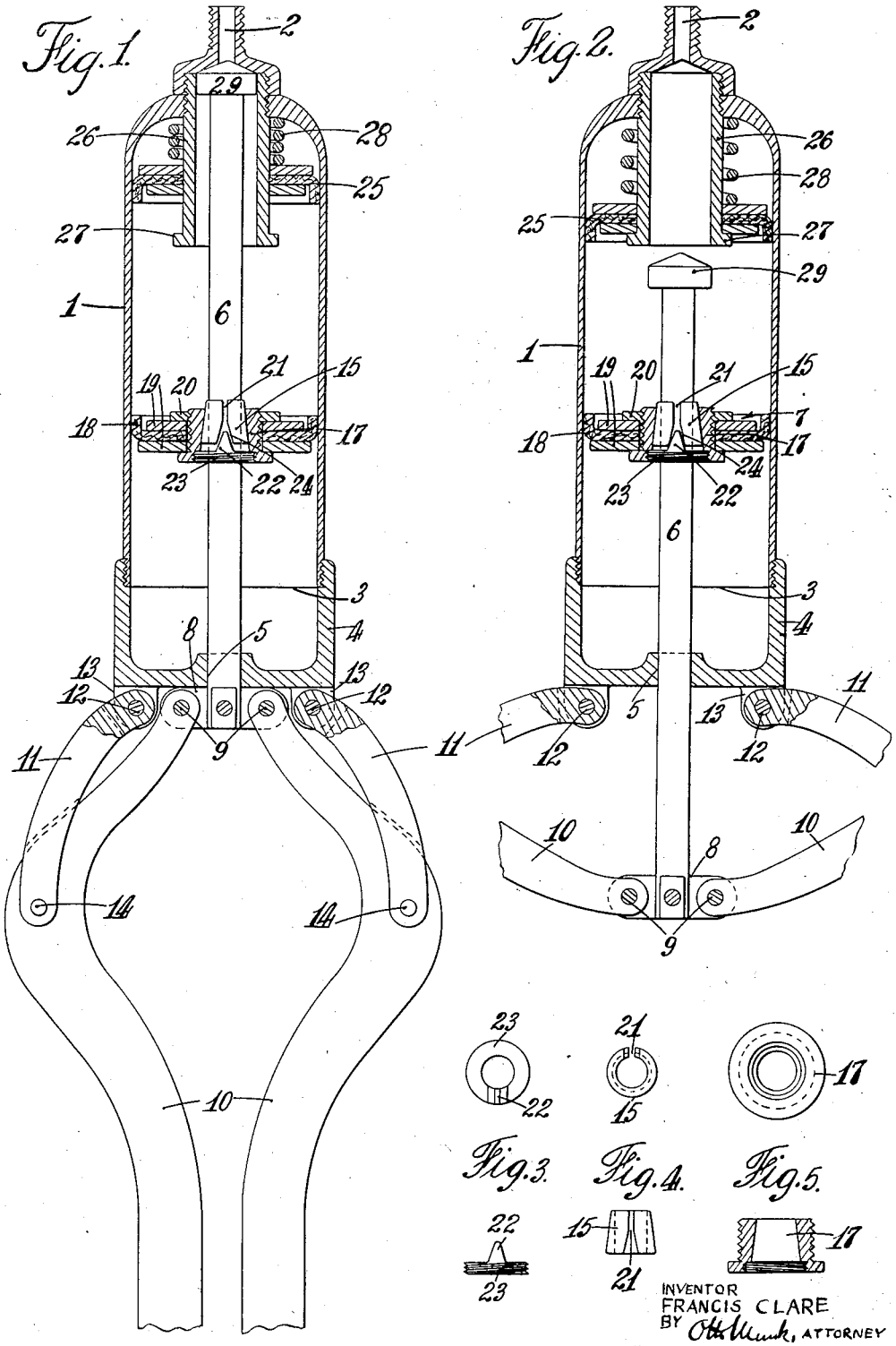

Patented Sept. 4, 1934

1,972,619

UNITED STATES PATENT OFFICE 1,972,619

GREASING PUMP OR GREASE GUN

Francis Clare, London, England

Application November 14, 1933, Serial No. 697,885
In Great Britain March 11, 1932

4 Claims. (Cl. 221—47.3)

This invention relates to a manually operated greasing pump or grease gun of the kind comprising a cylinder to receive grease and a reciprocating piston and piston rod by which grease is extruded through the exit end of the cylinder.

According to the invention a semi-rigid connection is provided between the piston and piston rod of a grease pump or grease gun and consists of a split conical collet frictionally mounted on the piston rod and disposed within a conical axial seating of the piston having a tongue lying within the split portion of the collet so that the tongue will expand the collet on the outward movement of the piston rod and enable same to slide within the piston, whereas on the inward or power stroke of the piston the collet grips the piston rod and when the pressure on the contained lubricant exceeds a determined value the piston rod is permitted to slide within the collet and continue its grease extruding action while the piston remains substantially stationary. When the piston rod is moved inwardly the collet thereon becomes wedged in the conical seating of the piston and causes an automatic coupling between the piston rod and piston until the resistance of the lubricant causes the slipping referred to. When disconnection takes place between the piston and piston rod on the reverse movement, the piston remains in substantially the same position as it was advanced on the inward or power stroke.

A further feature of the invention resides in the provision of an axially displaceable secondary spring influenced piston or plunger located in the exit end of the cylinder. When the main piston operates on the power stroke, the plunger is axially displaced, its spring yielding against the pressure of the grease displaced by said piston. On the return movement of the uncoupled piston rod the energy stored in the spring causes a return movement of the piston and the grease it displaces is forced into an axially disposed extruding chamber extending from the exit of the cylinder to a suitable distance within said cylinder, said grease being in readiness to be discharged by the piston rod in the next cycle of operations.

A manner of carrying the invention into effect according to one constructional arrangement is represented by the accompanying drawing, on which similar numerals of reference denote corresponding parts throughout the several views.

Fig. 1 is a longitudinal sectional elevation showing the piston and piston rod at the end of the power stroke.

Fig. 2 is a longitudinal sectional elevation showing the piston rod disconnected from the piston and performing the return stroke.

Figs. 3, 4 and 5 illustrate details of the clutch portion of the piston.

The grease pump comprises a cylinder 1, having an exit nozzle 2 and a filling opening 3 normally closed by a screw threaded cap 4 axially bored at 5 to accommodate the piston rod 6 having an associated piston 7. The outer end of the piston rod 6 has a cross head 8 to which are pivotally connected, at 9, the one ends of powerful manually operated levers 10. A pair of links 11 are pivotally anchored at their one ends 12 to lugs 13, on the outer end of the cap 4, the other ends of said links 11 being pivotally connected at 14 to short arm portions of the levers 10. This arrangement enables a very powerful leverage to be exerted upon the piston rod 6 owing to the toggle action formed, the pivots 12 constituting fulcra from which the power through the levers 10 is exerted.

The piston rod 6 is provided with a resilient conical collet 15 fitting frictionally thereon so as to normally move therewith, and a conical seating is formed axially in the piston, said seating being provided in an externally threaded housing 17, a cup leather 18 being mounted over the housing and clamped between two reinforcing washers 19. The piston unit comprising the housing 17, cup leather 18, and washers 19, is secured by the nut 20. The resilient collet 15 is longitudinally slotted at 21 to enable it to contract and expand, and a V shaped tongue 22 carried by the disc 23, threading over the piston rod 6 and screw engaging the back of the housing 17, is normally positioned within a V shaped portion 24 of the slot 21 of said collet.

An auxiliary plunger 25 is disposed in the cylinder 1 at the exit end thereof, said plunger being mounted upon an axially disposed extruding chamber 26 having a stop 27, and screwed into the inner end of the cylinder, the plunger being normally pressed inwardly by the action of the spring 28. The extruding chamber 26 will be normally filled with grease, as will be hereinafter described, the said grease being extruded by the nose 29 of the piston fitting the bore of the extruding chamber.

The operation of the greasing pump is as follows:

When the levers 10 are moved away from each other the collet gripping the piston rod 6 tends to move with it, but its slight movement is checked by the tongue 22 and the collet is expanded thereby uncoupling the piston rod from the piston so that said piston rod moves outwardly alone. On the opposite or return stroke of the piston, when the levers 10 are moved inwardly, the collet moves with the piston rod but is contracted by contact with the conical seating 16, thereby wedging or locking the piston 18 with the piston rod 6 so that they move together and exert pressure on the grease in the cylinder 1. The spring influenced plunger 25 yields under the pressure of the grease, while the piston rod 6 slips in the piston, due to the lubricant pressure exceeding a determined value, and performs its grease extruding operation through the extruding chamber 26. On the return stroke of the piston rod 6, when its associated piston 18 is automatically uncoupled and as the nose 29 emerges from the extruding chamber, the plunger 25, by reason of the energy stored up in the spring 28, automatically fills the extruding chamber with grease in readiness for the next extrusion. The displacement of the collet 15 with respect to the seating 16 is relatively small for the purpose of enabling a quick coupling and uncoupling action between the piston and piston rod.

A salient advantage of the combination of the plunger with the automatically coupled and uncoupled piston and piston rod resides in the fact that successive extrusions of grease are possible on the operation of the toggle device in view of the fact that the plunger automatically fills the extruding chamber with grease as soon as the piston is withdrawn from the extrusion chamber.

Having now described my invention, what I claim and desire to secure by Letters Patent is:

1. A greasing pump comprising in combination a cylinder, an axially bored piston, a piston rod engaging the bore of the piston in a semi-rigid manner, said semi-rigid connection comprising a conical seating in the axial bore of the piston, a split conical collet frictionally disposed on the piston rod and adapted to engage the conical seating, a tongue rigid with the piston and adapted to co-operate with the split portion of the conical collet, means for manually reciprocating the piston rod, an axial grease extruding chamber at the outlet end of the cylinder, a plunger fitting the cylinder and disposed co-axial with the extruding chamber, and a spring resisting the displacement of the plunger towards the outlet end of the cyinder.

2. A greasing pump comprising in combination a cylinder, an axially bored piston, a piston rod engaging the bore of the piston in a semi-rigid manner, said semi-rigid connection comprising a conical seating in the axial bore of the piston, a split conical collet frictionally disposed on the piston rod and adapted to engage the conical seating, a V shaped tongue rigid with the piston and adapted to engage the split portion of the conical collet, means for manually reciprocating the piston rod, an axial grease extruding chamber at the outlet end of the cylinder, a plunger fitting the cylinder and disposed co-axial with the extruding chamber, and a spring resisting the dispacement of the plunger towards the outlet end of the cylinder.

3. A greasing pump comprising in combination a cylinder, an axially bored piston, a piston rod engaging the bore of the piston in a semi-rigid manner, said semi-rigid connection comprising a conical seating in the axial bore of the piston, a split conical collet frictionally disposed on the piston rod and adapted to engage the conical seating, an axially screw threaded recess in the head of the piston, an externally screw threaded axially bored disc engaging the screw threaded recess, a V shaped tongue rigid with the disc and adapted to engage the split portion of the collet, means for manually reciprocating the piston rod, an axial grease extruding chamber at the outlet end of the cylinder, a plunger fitting the cylinder and disposed co-axial with the extruding chamber, and a spring resisting the displacement of the plunger towards the outlet end of the cylinder.

4. A greasing pump comprising in combination a cylinder, an axially bored piston, a piston rod engaging the bore of the piston in a semi-rigid manner, said semi-rigid connection comprising a conical seating in the axial bore of the piston, a split conical collet frictionally disposed on the piston rod and adapted to engage the conical seating, a tongue rigid with the piston and adapted to co-operate with the split portion of the conical collet, means for manually reciprocating the piston rod, a screw threaded axial grease extruding chamber screw engaging the outlet end of the cylinder, a plunger fitting the cylinder and disposed co-axial with the extruding chamber, a spring resisting the displacement of the plunger towards the outlet end of the cylinder, and an abutment at the inner end of the extruding chamber limiting the inward movement of the plunger.

FRANCIS CLARE.